United States Patent Office 3,009,818
Patented Nov. 21, 1961

3,009,818
PROCESS OF PREPARING A DEHYDRATED PRECOOKED EGG PRODUCT
Louis Jokay, Chicago, and Richard I. Meyer, Park Forest, Ill., assignors to the United States of America as represented by the Secretary of the Army
No Drawing. Filed Apr. 11, 1960, Ser. No. 21,568
3 Claims. (Cl. 99—210)
(Granted under Title 35, U.S. Code (1952), sec. 266)

The invention described herein, if patented, may be manufactured and used by or for the Government for governmental purposes, without the payment to us of any royalty thereon.

This invention relates to a vacuum-freeze-dehydrated pre-cooked egg product. More particularly, the invention relates to the vacuum-freeze dehydration of de-sugared pasteurized egg material produced in accordance with industrial practice.

The Armed Forces have long desired a taste-acceptable dehydrated egg product which has good storage stability and which can be rehydrated to the substantial equal of a fresh egg dish with regard to appearance, texture and flavor. Great progress has been made since World War II; however, this ideal has still not been realized fully. It is obvious to the logistician that a dehydrated egg product which is produced and shipped to oversea areas at substantial expense to the taxpayer, is not a complete success if even a small percentage of it is rejected by individual soldiers. Evidently, the soldier also loses in such a case, as he is deprived of the nutritional value of the egg dish.

With this situation in mind, intensive research has been conducted at the Quartermaster Food & Container Institute for the Armed Forces, at Chicago, Illinois, to produce a deyhdrated egg product which is storage-stable and taste-acceptable to any person who will accept a fresh scrambled egg dish. Other research objects were a dehydrated egg product which can be rehydrated and made into a fully taste-acceptable scrambled egg dish even by an individual soldier in the field, by the mere expedient of adding hot water, without the assistance of professional or semi-professional cooks.

The result of the foregoing research project is embodied in the instant invention, which attains the foregoing objects, as well as additional objects, which will be briefly enumerated hereafter.

It is thus a principal object of the invention to produce a vacuum-freeze-dehydrated (lyophilized) egg product which upon rehydration by hot water will possess a natural flavor, aroma, texture and color comparable to fresh scrambled eggs. A further object is to produce a dry egg product which retains its original flavor for an extended period of time, particularly when packaged in a atmosphere of very low oxygen and under refrigeration, or even at non-refrigerated storage conditions.

An additional object of the invention is a dehydrated egg product which can be eaten even without rehydration, for instance by a soldier in a foxhole, who is unable to gain access to hot water for rehydration purposes.

An additional object is the production of a vacuum-freeze-dehydrated egg product which can be prepared with conventional food-processing machinery, and without the need for developing special skills on the part of operating personnel who are familiar with such machinery.

Other objects and advantages of our invention will become apparent in the course of the following description of preferred methods of carrying our invention into practice.

In accordance with the present invention fresh or frozen (and then thawed) whole eggs are preferably first pasteurized, e.g., by heating to 140–142° F. for 3–3½ minutes, and stabilized by removal of glucose, in accordance with industrial practice (e.g., by a glucose oxidase and catalase enzyme treatment in accordance with Patent No. 2,744,017 and/or one or more of Patents No. 2,758,933, 2,758,934 and 2,758,935, or by a yeast fermentation treatment in accordance with Patent No. 2,460,986). The egg material is then mixed with a lesser amount of water, preferably in the ratio of about one part of hot water of a temperature not above about 140° F., to about three parts by weight of liquid whole egg material. Egg and water are mixed for 5–10 minutes in a mechanical mixer. Food grade salt is dissolved in the warm water at a rate of one ounce per each 16 lbs. of egg-water mix.

The egg-water-salt mixture is cooked at a temperature substantially below the boiling point of water in a manner to eliminate burning. For this purpose, a double jacketed stainless steel kettle warmed by hot water is used. During warming and cooking, the mixture is constantly agitated so that no portion of the egg is burned to the side of the kettle. Adequate stirring provides an equal rate of heating the mix. We have found that during the cooking step, the internal temperature of any portion of the liquid egg and water mix should not exceed about 166° F.; for this purpose the cooking kettle should have proper temperature control. The mix is warmed at such a rate that the temperature of the product should not rise more than 10° F. per 60 seconds. The cooking and coagulation of egg material is stopped at the point when the egg has formed a rather soft coagulum without hard curd-like particles and without any sign of separation of moisture. Moisture separation from the coagulated mass is the sign of over-coagulation and will result in a tougher texture. Finishing the product coagulation by reaching the proper uniform soft consistency is best done at a temperature of about 158–160° F.

The soft, coagulated product is spread on a tray while still hot in a layer not exceeding about ¾" thickness. The product is chilled quickly to a 40–45° F. temperature. A properly coagulated layer should be firm at 40–45° F. The chilled egg sheet in the tray is so sliced with a blade that the individual cake slices are physically separated from each other. At this point the sheet is so matted that the slices will stay separated. Improper matting will result if the temperature of the coagulated product drops below 115–120° F., at the time when being spread out on the tray in a sheet form.

*Freezing*

The matted and coagulated egg slices are then frozen on flat trays in a layer not exceeding about ¾" thickness (preferably about ½" thickness). The "egg-matt" should not be chilled longer than one hour preceding freezing since excessively long exposure of the egg-matt to air will develop a hard skin-like layer on the surface of the product. This skin-like layer will also dehydrate, but upon rehydration of the product it will cause an undesirable grainy texture.

The rate of freezing has an important bearing on the physical quality, insofar as ability to rehydrate and appearance and product uniformity is concerned. It is important to accomplish the freezing step gradually. A matted layer in the shape of square slices of ½"–¾" in thickness should reach a temperature of 0° F. in about 60 minutes.

We have found that matted egg product which has been frozen at too slow a rate, will develop the hardened "skin" layer on the surface, which in turn will cause a grainy texture upon rehydration. Furthermore, slowly frozen samples will be soggy, rubbery and spongy after rehydration due to uneven distribution of water in the rehydrated product. A proper rate of freezing has been achieved in a blast freezer through convection when the air temperature is held between −10° F. and −40° F. Blast freezing is preferred over shelf (or conduction) freezing because direct contact with a very cold refrigerant or a sub-zero refrigerated shelf will cause definite bleaching of the natural yellow color of the product.

In order to eliminate "case hardening" during drying, the product should be super-cooled to the ambient temperature of the freezer chamber before transfer to the freeze dehydrator (preferably to below −10° F.).

Vacuum-dehydration

The dehydration process is conducted in a chamber equipped for obtaining and holding a very low absolute pressure (high vacuum). The chamber is equipped with shelves which can be heated or cooled by means of a circulating liquid medium. The drying chamber is thoroughly cleaned and free of all traces of foreign odors coming from disinfectant, washing solution or from products previously dried. The shelves should preferably be chilled, using ice water or other refrigerant before and during loading, and while the vacuum is being drawn on the oven. However, if cooling of the shelves is impractical, the frozen trays should be kept frozen and as cold as possible before loading the oven.

To avoid thawing of any portion of the frozen egg while it is being transferred to the dryer, the transfer should be accomplished and a vacuum of about 1.5 millimeters or lower be drawn in not to exceed about 5–8 minutes. Thirty minutes after reaching 1.5 millimeters absolute pressure (preferably 600–800 microns), heat is applied to the circulating medium. The final temperature of the circulating medium should be about 115° F. This temperature should be reached in not less than 45 minutes. The rate of heating should be so regulated that the absolute pressure in the drying chamber at no time exceeds 1.5 millimeters (1500 microns). When these conditions have been established, they are to be maintained throughout the drying process, until the product contains 2 percent moisture or less. On completion of the drying process, the pressure inside the chamber is adjusted to atmospheric conditions by flooding the chamber with nitrogen or other inert gas of high purity.

The dehydrated egg product thus produced is storage-stable, and can be kept without measurable deterioration for several weeks at ordinary temperatures and for several months if refrigerated and/or stored in an inert atmosphere (e.g., nitrogen or carbon dioxide). Rehydration is accomplished by stirring with hot water, and the resulting egg dish is quite indistinguishable in appearance, texture and taste from a scrambled egg dish prepared from fresh eggs.

The preferred form of freeze-dehydrated pre-cooked egg product is made of pasteurized, deglucosed (stabilized) frozen or unfrozen liquid whole eggs; however, fresh, unpasteurized, unstabilized whole eggs might be used also to produce a product with the same physical characteristics but lacking stability.

Alternate example

Another form of freeze-dehydrated ready-to-eat egg product is produced in a solid loaf form which can be reduced to smaller pieces and consumed in the dehydrated state. Stabilized liquid whole eggs are coagulated to a harder consistency than in the previous example, to the point where some moisture will separate out in the cooking kettle. The hot coagulated egg is matted in a loaf press to a solid block. Density is controlled by applying various degrees of pressure on the matted egg inside the loaf press. After surplus moisture has been drained off, the molded loaf is chilled while the eggs are maintained at a constant pressure. The chilled, compressed loaf is sliced before freezing. The freeze and vacuum-dehydration is then accomplished as in the previous example.

The products of the principal or alternate example may be flavored, if desired, by using various kind of additives such as a smoke flavor or cheese, onions, chives, and/or sweet peppers. The flavoring substances can be added to the mix before coagulation or before freezing, or to the dry product at the time of rehydration.

It will thus be seen that we have provided a simple process for freezing-vacuum-dehydrating whole eggs, wherein by the observance of certain critical conditions, particularly during the cooking and freezing steps preceding the vacuum dehydration, a dehydrated egg product is produced which is capable of being rehydrated to a dish having the appearance, flavor, texture and nutritious qualities of fresh scrambled eggs, or which may be eaten "as is" (i.e., without rehydration) as a quick-energy food. It will be readily understood, of course, that departures from the specific conditions of our preferred method are possible without departing from the spirit and scope of our invention. We therefore intend to encompass such modifications within the definition of our invention as set forth in the appended claims.

We claim:

1. Process of preparing a dehydrated pre-cooked egg product, comprising mixing liquid whole eggs, which have been stabilized by removal of glucose, with a lesser volume of water, the volume of said liquid eggs being not more than about three parts per one part of water, cooking said mixture to an internal temperature not exceeding about 166° F. until it is coagulated to a soft consistency, forming said coagulated product into a flat layer, quick-chilling said flat layer, gradually freezing said chilled layer at such a rate that a layer of a thickness of about ½–¾ inch reaches about 0° F. in not more than about 60 minutes, and vacuum-dehydrating said frozen layer to a moisture content not exceeding about 2%; whereby a readily rehydratable storage-stable egg product is obtained, which is rehydratable with hot water to substantially the appearance, texture and flavor of fresh scrambled eggs.

2. Process according to claim 1, wherein said eggs are pasteurized prior to being mixed with water.

3. Process according to claim 1, wherein said chilled layer is pressed into loaf shape and sliced, prior to freezing.

References Cited in the file of this patent

UNITED STATES PATENTS

| | | |
|---|---|---|
| 233,750 | Halvorson | Oct. 26, 1880 |
| 2,292,447 | Irwin | Aug. 11, 1942 |
| 2,476,412 | Harris | July 19, 1949 |
| 2,758,933 | Shaffer | Aug. 14, 1956 |